(12) United States Patent
Wang et al.

(10) Patent No.: US 12,554,295 B2
(45) Date of Patent: Feb. 17, 2026

(54) LAPTOP COMPUTER

(71) Applicant: Acer Incorporated, New Taipei (TW)

(72) Inventors: Yu-Shih Wang, New Taipei (TW);
Wen-Chieh Tai, New Taipei (TW);
Chih-Chun Liu, New Taipei (TW);
Dong-Sheng Wu, New Taipei (TW);
Tzu-Wei Lin, New Taipei (TW);
Yi-Mu Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 138 days.

(21) Appl. No.: 18/624,005

(22) Filed: Apr. 1, 2024

(65) Prior Publication Data

US 2025/0138600 A1    May 1, 2025

(30) Foreign Application Priority Data

Oct. 27, 2023    (TW) .................................. 112141306

(51) Int. Cl.
*G06F 1/18*     (2006.01)
*G06F 1/16*     (2006.01)
*G06F 1/183*    (2026.01)

(52) U.S. Cl.
CPC ............ *G06F 1/183* (2013.01); *G06F 1/1616* (2013.01)

(58) Field of Classification Search
CPC ........................................................ G06F 1/18
See application file for complete search history.

(56) References Cited

U.S. PATENT DOCUMENTS

| 5,796,579 A | 8/1998 | Nakajima et al. |
| 2013/0279112 A1* | 10/2013 | Kim .................. H05K 7/20154 361/692 |
| 2020/0272211 A1* | 8/2020 | Schnell .................. G06F 1/185 |
| 2023/0185277 A1 | 6/2023 | Morrison et al. |
| 2023/0280799 A1 | 9/2023 | Kinoshita et al. |

FOREIGN PATENT DOCUMENTS

| CN | 215816552 | 2/2022 |
| TW | 201532094 | 8/2015 |

* cited by examiner

*Primary Examiner* — Jerry Wu
(74) *Attorney, Agent, or Firm* — JCIPRNET

(57) ABSTRACT

A laptop computer including a first casing, a first sub-circuit board, an input module, a second casing, a motherboard, and a bridge circuit board is provided. The first sub-circuit board is disposed at the first casing. The input module is disposed at the first casing and electrically connected to the first sub-circuit board. The motherboard is disposed at the second casing. The first casing and the second casing are assembled together, such that the first sub-circuit board, the bridge circuit board, and the motherboard are partially overlapped, and the first sub-circuit board is electrically connected to the motherboard via the bridge circuit board.

9 Claims, 7 Drawing Sheets

LAPTOP COMPUTER

CROSS-REFERENCE TO RELATED APPLICATION

This application claims the priority benefit of Taiwan application serial no. 112141306, filed on Oct. 27, 2023. The entirety of the above-mentioned patent application is hereby incorporated by reference herein and made a part of this specification.

BACKGROUND OF THE INVENTION

Field of the Invention

The invention relates to a laptop computer.

Description of Related Art

ESG is the abbreviation of three English words, namely Environment, Social, and Governance. The United Nations Global Compact first proposed the concept of ESG in 2004, and it is regarded as an indicator for evaluating a company's operations. ESG is a measure of a company's sustainable development indicators, which are the carbon reduction and sustainable development goals desired by international and domestic governments. In the past, business operations only needed to pay attention to financial data. However, even if the financial reports are promising, if the operations violated human rights, discharged wastewater, infringed on the rights of consumers, and harmed the living environment of the Earth's creatures, the international goal of promoting earth sustainability is violated, prompting institutional investors to reduce investment and cooperation in such companies, and even affecting the company's reputation. Today, companies that value the ESG concept not only have transparent financial reports, but also have stable, low-risk operating models, and their long-term performance is also relatively stable. For the above reasons, for the electronics manufacturing industry, whether the products manufactured thereby may meet the above conditions has become one of the product evaluation conditions.

Taking laptop computers as an example, the evaluation content thereof is based on the amount of energy consumed in the manufacturing process of the product and whether the product has the ability to be repaired (renewed). In order to achieve the above goals, the member design and assembly configuration of laptop computers require corresponding new techniques and measures.

In terms of assembly and configuration, the assembly process of existing laptop computers includes the positioning and buckling of tenons or hooks, the welding of members or electronic elements, screw locking and fixing, and the docking of related electrical conducting members (connectors, cables, or wires, FPC) . . . etc. In addition to the high complexity of the process, related accessories and consumables often do not meet the above sustainability conditions. Especially for subsequent maintenance and disassembly, the relevant connection ports or connectors of the members are readily covered due to stacking, making it unlikely for the operator to readily disassemble and assemble the members. At the same time, the electrical connection relationship between members also needs to be taken into account. Due to the complexity of electrical conducting members between existing electronic members, during the assembly process of the members, in addition to performing wire management operations, the operator also needs to worry about accidents such as misconnection of connectors. In addition, after the assembly is completed, there may be situations such as members being separated due to vibration or falling, etc., or the electrical conducting members falling off.

Based on the above, based on the configuration and connection relationship of existing electronic members in laptop computers, the above sustainability goals are not readily met.

SUMMARY OF THE INVENTION

The invention provides a laptop computer, in which electrical connections are completed during the structural assembly process via a stacked structure of combined circuit boards and via an intuitive assembly method.

A laptop computer of the invention includes a first casing, a first sub-circuit board, an input module, a second casing, a motherboard, and a bridge circuit board. The first sub-circuit board is disposed at the first casing. The input module is disposed at the first casing and electrically connected to the first sub-circuit board. The motherboard is disposed at the second casing. The first casing and the second casing are assembled together, such that the first sub-circuit board, the bridge circuit board, and the motherboard are partially overlapped, and the first sub-circuit board is electrically connected to the motherboard via the bridge circuit board.

Based on the above, the member configuration of the system host of the laptop computer, especially the assembly configuration of the circuit board, matches the assembly method of the first casing and the second casing of the system host, and adopts stacked assembly to effectively simplify the assembly process, wherein the first casing and the keyboard, the touch panel, and the first sub-circuit board assembled thereon are regarded as a set of semi-finished products, and the second casing and the motherboard and the second sub-circuit board disposed thereon are regarded as another set of semi-finished products. When the semi-finished products are independently completed, the bridge circuit board may be abutted between the two groups of semi-finished products, so that the electrical connection relationship of a plurality of circuit boards may also be completed while the structure is assembled, without the need to manage wires or cables and plug in connectors as in the prior art.

At the same time, the structural assembly adopts stacked assembly, so users do not need to worry about whether to reserve space for the connectors and wires (or cables) to be plugged in. In other words, the laptop computer of the invention may be assembled one by one using an intuitive assembly method due to the stacked and assembled members. Therefore, the assembly process may be effectively simplified and time and assembly costs may be reduced, thus also affecting the process and costs needed for subsequent maintenance.

This is equivalent to providing a simplified disassembly and assembly process, so that the laptop computer has a repairable and regenerative nature, which is conducive to achieving the above sustainability conditions.

DESCRIPTION OF THE EMBODIMENTS

Figure 1:
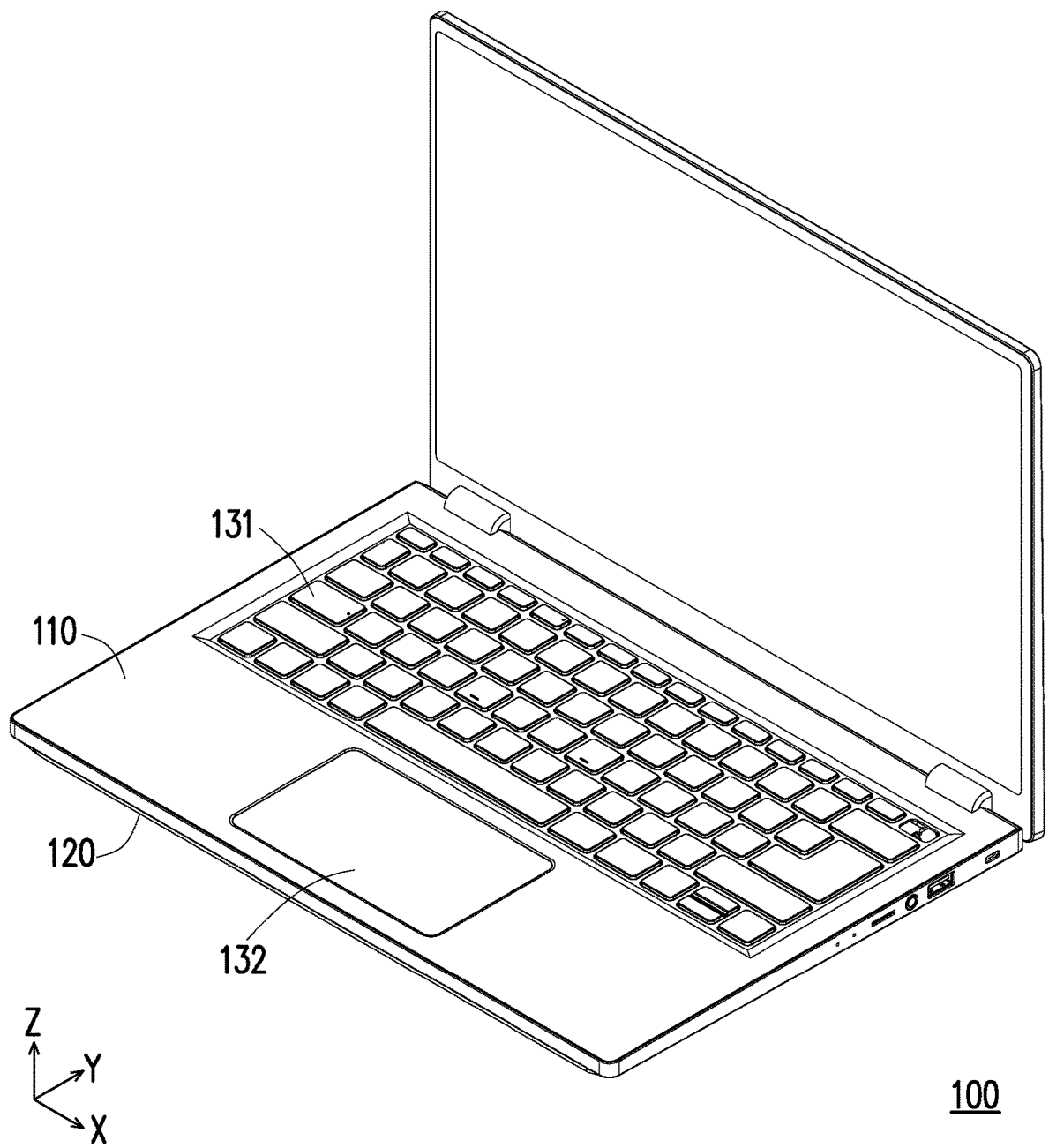
FIG. 1 is a schematic diagram of a laptop computer according to an embodiment of the invention.

FIG. 1 is a schematic diagram of a laptop computer according to an embodiment of the invention. Cartesian coordinates X-Y-Z are also provided to facilitate member description. Please refer to FIG. 1. In the present embodiment, a laptop computer 100 includes a body and an input module 130, wherein the body shown is the host of the laptop computer 100 including a first casing 110 and a second casing 120. The input module 130 includes a keyboard 131 and a touch pad 132 respectively disposed on the first casing 110. In the following, only the differences between the laptop computer 100 and the prior art are described, and the similarities with the prior art are not described again.

Figure 2:
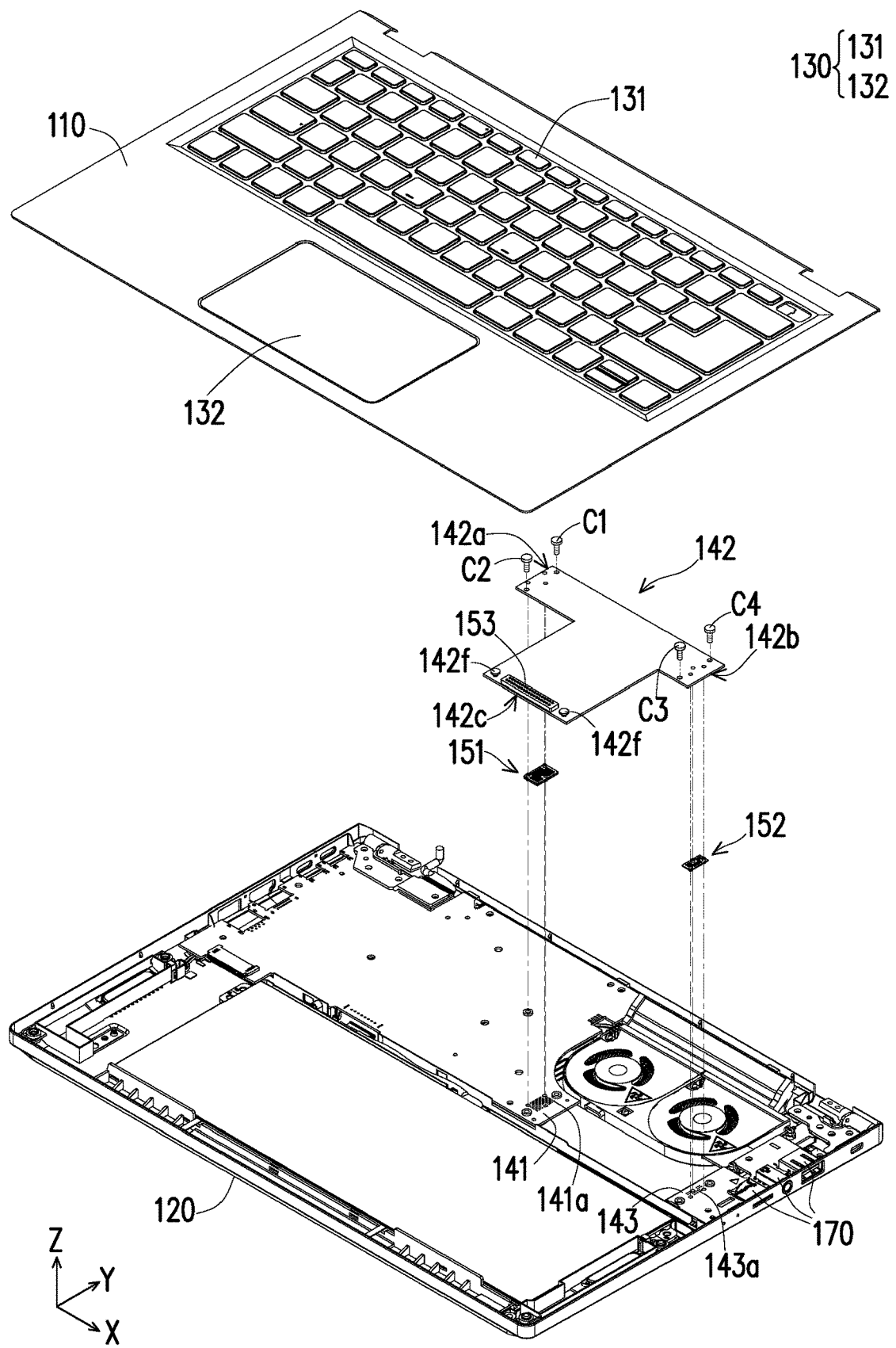
FIG. 2 is an exploded view of some members of the laptop computer of FIG. 1.
Figure 3A:
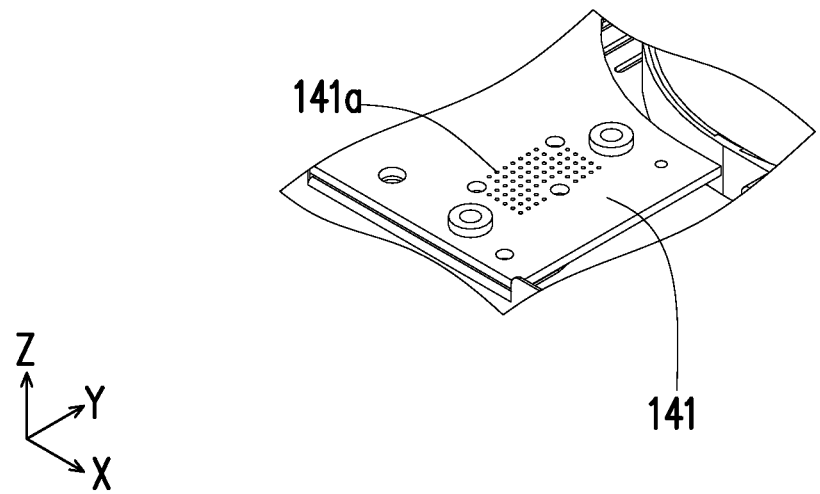
FIG. 3A to FIG. 3C respectively illustrate partial enlarged views of some members of FIG. 2.
Figure 3B:
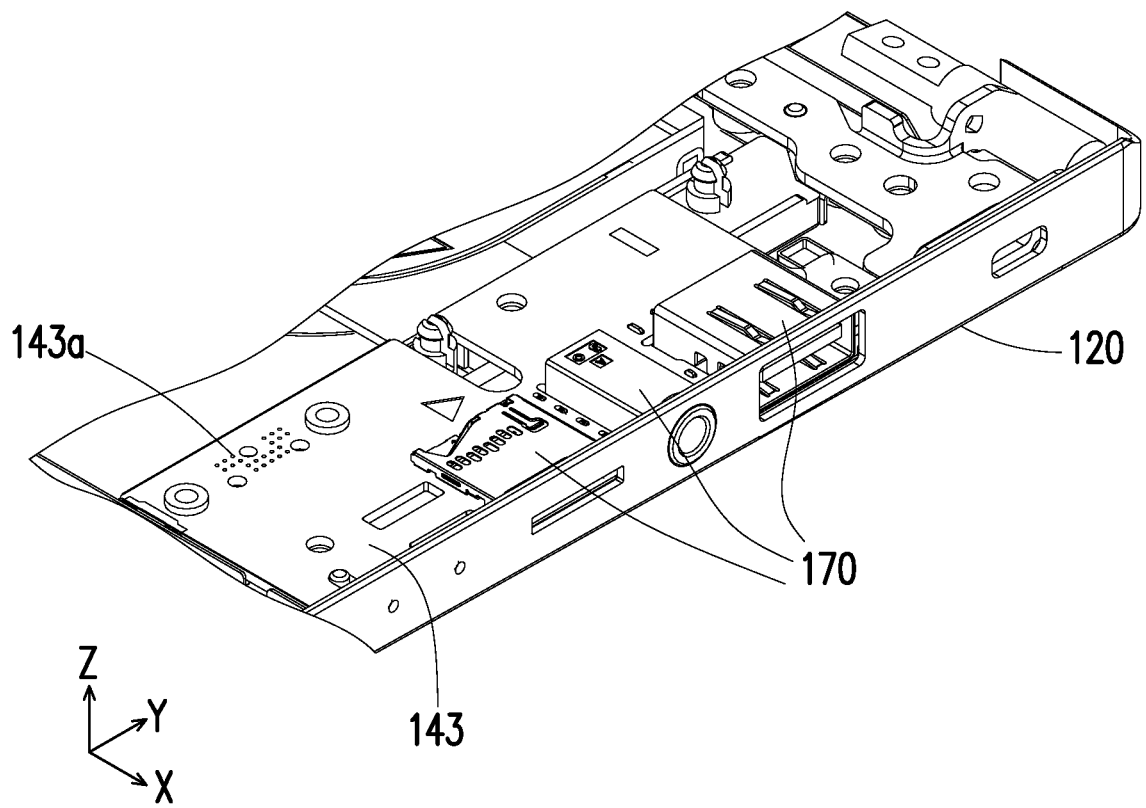
Figure 3C:
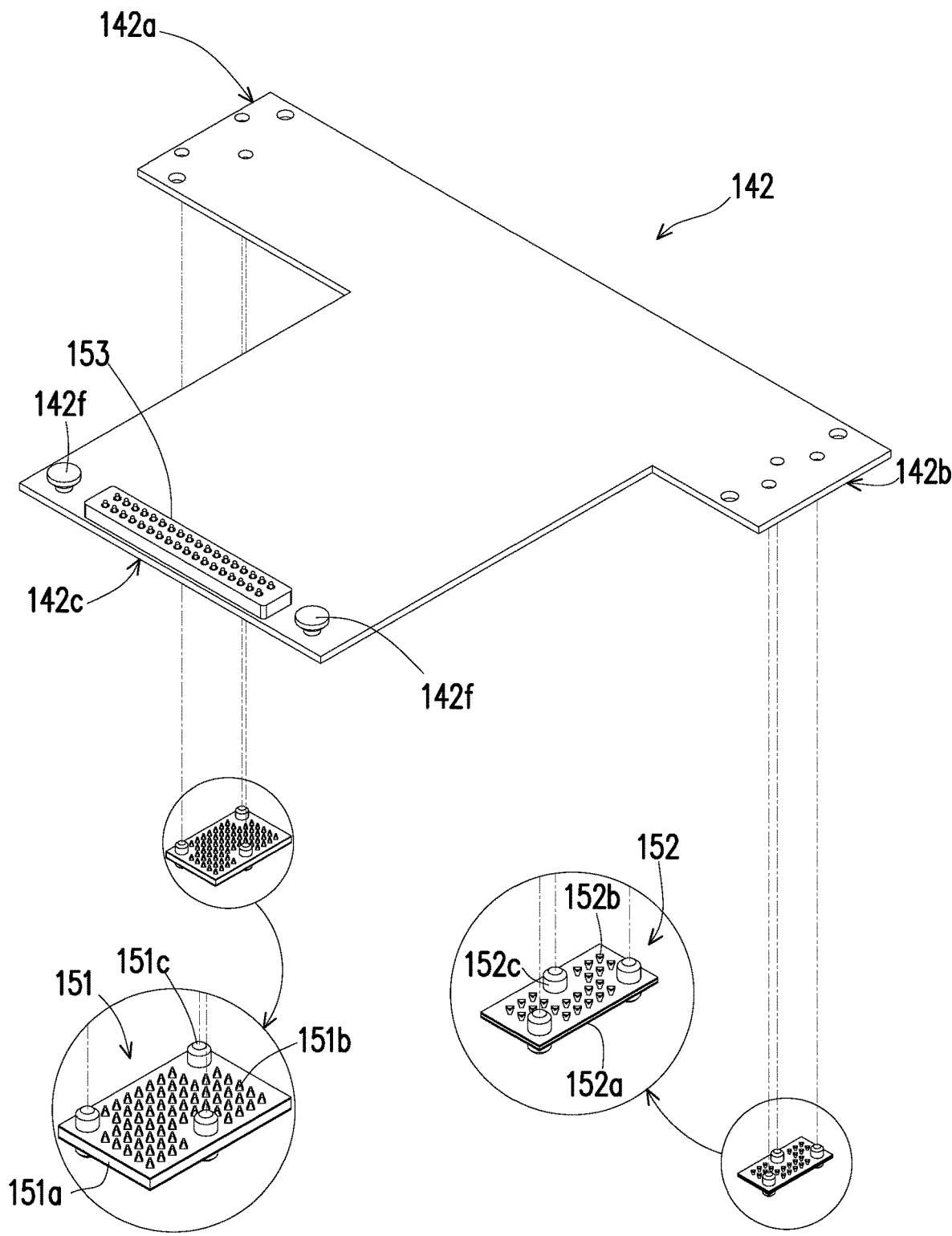
Figure 4A:
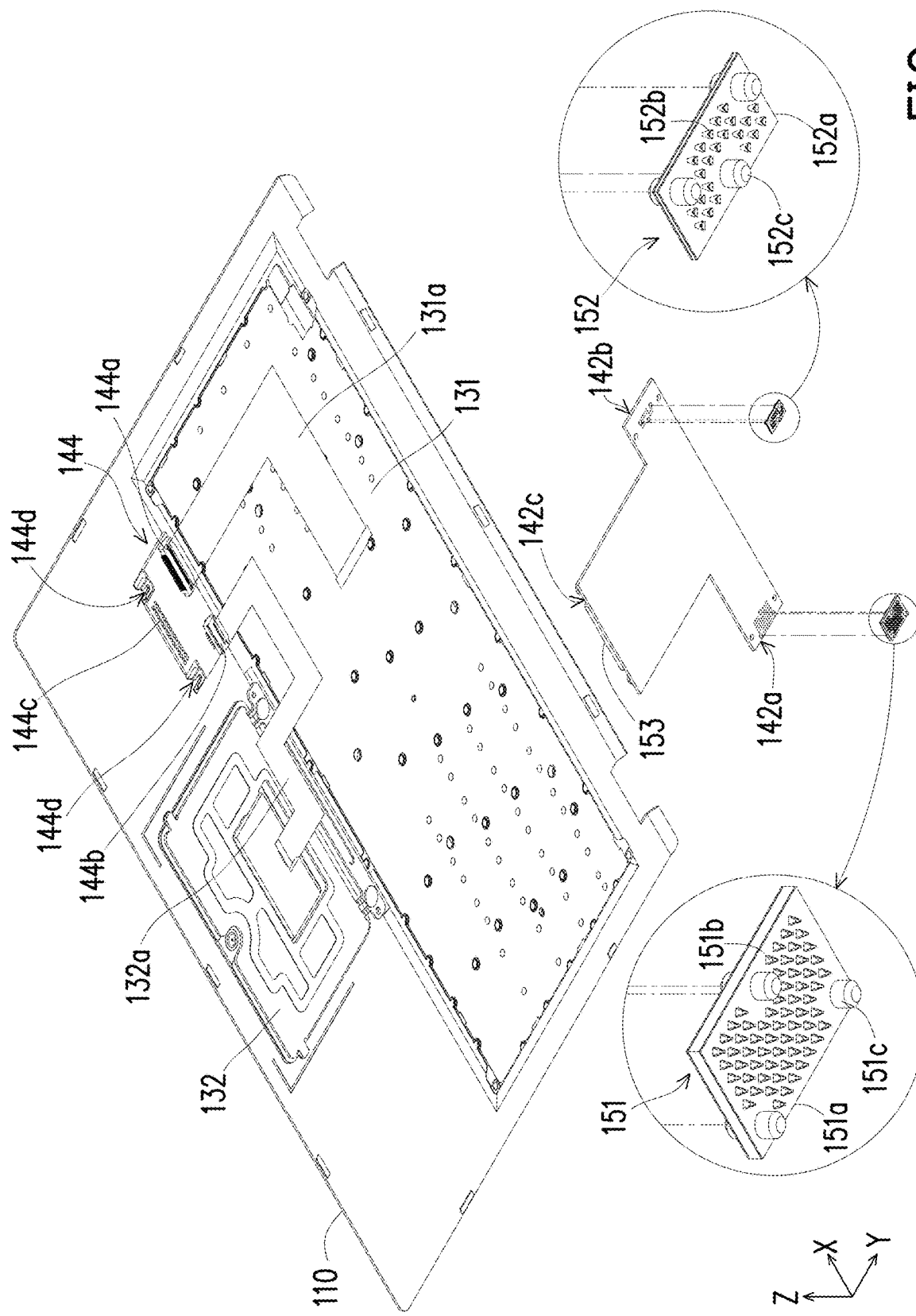
FIG. 4A shows some members of FIG. 2 from another perspective.
Figure 4B:
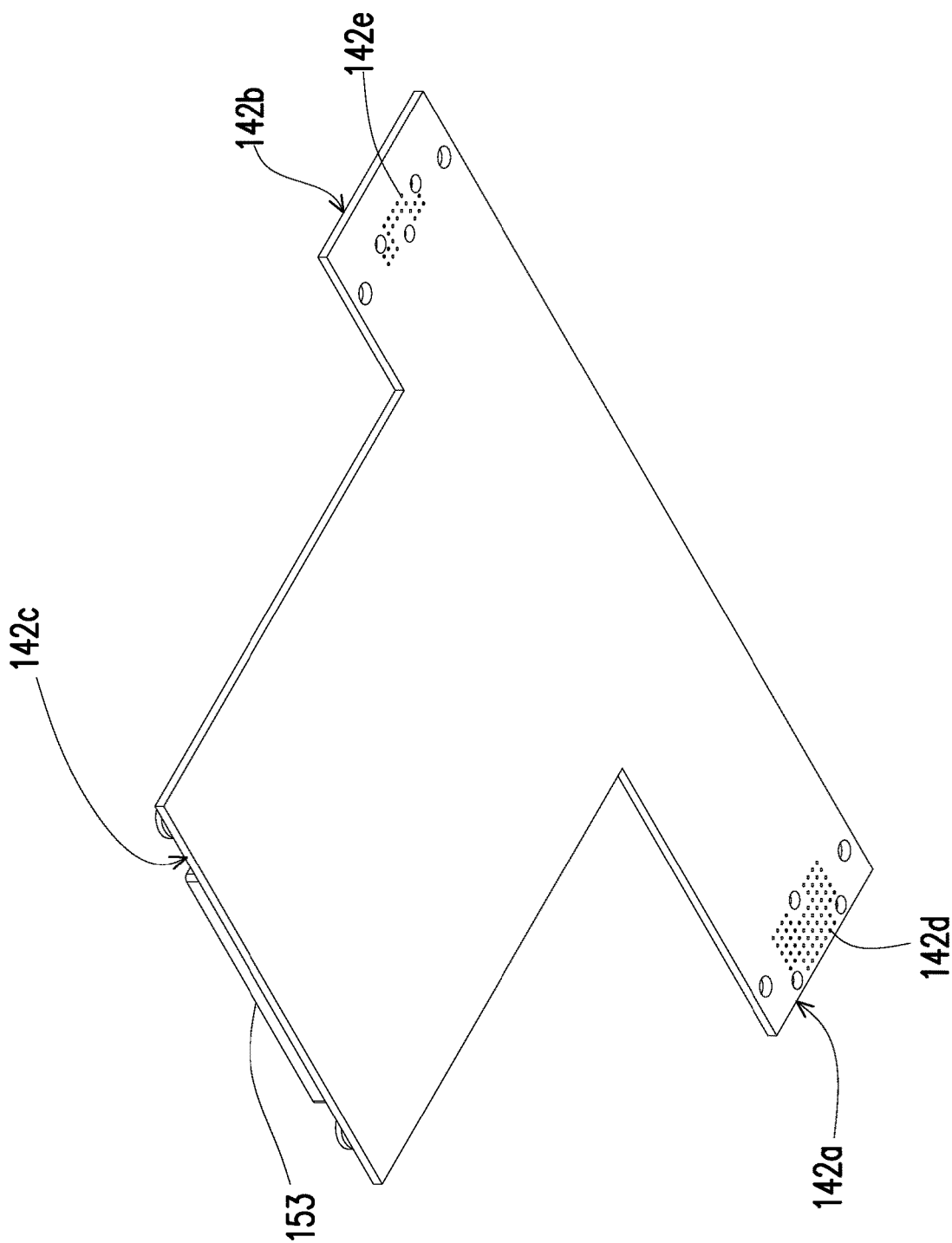
FIG. 4B is an enlarged schematic diagram of the bridge circuit board of FIG. 4A.

FIG. 2 is an exploded view of some members of the laptop computer of FIG. 1, in which the screen of the laptop computer 100 is omitted to facilitate identification of other members. FIG. 3A to FIG. 3C respectively illustrate partial enlarged views of some members of FIG. 2. FIG. 4A shows some members of FIG. 2 from another perspective. FIG. 4B is an enlarged schematic diagram of the bridge circuit board of FIG. 4A. Please first refer to FIG. 2 and FIG. 4A. In the present embodiment, the laptop computer 100 also includes a first sub-circuit board 144, a motherboard 141, and a bridge circuit board 142. The first sub-circuit board 144 is disposed at the first casing 110. The input module 130 is disposed at the first casing 110 and electrically connected to the first sub-circuit board 144. The motherboard 141 is disposed at the second casing 120. The first casing 110 and the second casing 120 are assembled together, such that the first sub-circuit board 144, the bridge circuit board 142, and the motherboard 141 are partially overlapped, and the first sub-circuit board 144 is electrically connected to the motherboard 141 via the bridge circuit board 142.

Moreover, the laptop computer 100 also includes a second sub-circuit board 143 and at least one connector (a plurality of connectors 170 are shown here as examples, including USB connectors, audio source connectors, or card reader modules, which are all packaged or soldered on the second sub-circuit board 143 to electrically connect the circuits on the board). The second sub-circuit board 143 is disposed at the second casing 120. The connectors 170 are disposed on the second sub-circuit board 143. When the first casing 110 and the second casing 120 are assembled together, the second sub-circuit board 143 is partially stacked at the bridge circuit board 142, and the connectors 170 are electrically connected to the motherboard 141 via the second sub-circuit board 143 and the bridge circuit board 142.

Specifically, as shown in FIG. 4A, the first sub-circuit board 144 is disposed at the bottom surface of the first casing 110 to face the second casing 120 (equivalent to the negative Z-axis direction). The keyboard 131 and the touch panel 132 disposed at the first casing 110 are respectively connected to electrical connectors 144a and 144b of the first sub-circuit board 144 via electrical transmission members 131a and 132a, such as wires, FPC (flexible printed circuits), or cables. Next, referring to FIG. 2, FIG. 3C, and FIG. 4A, the laptop computer 100 also includes a pogo pin connector 153 disposed at a protrusion three 142c of the bridge circuit board 142, and the first sub-circuit board 144 also has a plurality of conductive contact pads 144c. Therefore, when the first sub-circuit board 144 is assembled to the second casing 120 along with the first casing 110, the first sub-circuit board 144 is stacked at the protrusion three 142c. By docking the conductive contact pads 144c with the pogo pin connector 153, the input module 130 may be electrically connected to the bridge circuit board 142 via the first sub-circuit board 144 and the pogo pin connector 153 (and the conductive contact pads 144c).

Moreover, referring to FIG. 3A, FIG. 3C, and FIG. 4A (or FIG. 4B), the bridge circuit board 142 also has a protrusion one 142a and a conductive array two 142d located on the protrusion one 142a. The motherboard 141 has a conductive array three 141a located at a side edge. The laptop computer 100 also includes a first mezzanine connector 151 (for example, a PC beam) electrically connected between the bridge circuit board 142 and the motherboard 141. Furthermore, the first mezzanine connector 151 is formed by a plate body one 151a and two conductive arrays one 151b, wherein the two conductive arrays one 151b are respectively disposed at two opposite surfaces of the plate body one 151a. Accordingly, when the first casing 110 and the second casing 120 are assembled, the protrusion one 142a of the bridge circuit board 142 is also overlapped on the motherboard 141 (as shown in FIG. 2), so that the two conductive arrays one 151b of the first mezzanine connector 151 are respectively connected to the conductive array two 142d and the conductive array three 141a to achieve the effect that the bridge circuit board 142 is electrically connected to the motherboard 141 via the first mezzanine connector 151. In this way, following the electrical connection feature of the input module 130 being electrically connected to the bridge circuit board 142, the input module 130 may be electrically connected to the motherboard 141 smoothly.

In the present embodiment, the two conductive arrays one 151b (see FIG. 3C and FIG. 4A) are respectively elastic piece arrays, and the conductive array two 142d (shown in FIG. 4A and FIG. 4B) and the conductive array three 141a (shown in FIG. 2 and FIG. 3A) are respectively contact pad arrays.

Moreover, referring to FIG. 3B, FIG. 3C, and FIG. 4A, the laptop computer 100 of the present embodiment further includes a second mezzanine connector 152 (for example, a PC beam) electrically connected between the second sub-circuit board 143 and the bridge circuit board 142. Furthermore, as shown in FIG. 3C and FIG. 4A, the second mezzanine connector 152 includes a plate body two 152a and two conductive arrays four 152b, and the two conductive arrays four 152b are respectively disposed on two opposite surfaces of the plate body two 152a and electrically connected to each other correspondingly. Correspondingly, the bridge circuit board 142 also has a protrusion two 142b, and the protrusion two 142b has a conductive array five 142e, as shown in FIG. 4B. The second sub-circuit board 143 has a conductive array six 143a, and when the first casing 110 is assembled to the second casing 120, the two conductive arrays four 152b are respectively connected to the conductive array five 142e and the conductive array six 143a.

As shown in FIG. 3C and FIG. 4A, the two conductive arrays four 152b are respectively elastic piece arrays, and as shown in FIG. 3B and FIG. 4B, the conductive array five 142e and the conductive array six 143a are contact pad arrays respectively. Accordingly, when the protrusion two 142b is stacked at the second sub-circuit board 143 (as shown in FIG. 2), the connectors 170 may be electrically connected to the bridge circuit board 142 via the second sub-circuit board 143 and the second mezzanine connector 152. At the same time, also because the bridge circuit board 142 and the motherboard 141 are electrically connected to each other via the first mezzanine connector 151, at this time, the connectors 170 and the second sub-circuit board 143 may be electrically connected to the mainboard 141 via the bridge circuit board 142.

Please refer to FIG. 2 again. Via the corresponding connection relationship between the first sub-circuit board 144, the second sub-circuit board 143, the bridge circuit board 142, and the motherboard 141, the input module 130 and the connectors 170 may be electrically connected to the motherboard 141 smoothly. In particular, it may be found from the corresponding relationship between the above members that, the laptop computer 100 of the present embodiment may be assembled in an intuitive manner due to the stacking relationship of the members. That is, the effects of structural assembly and electrical connection may be completed at the same time by stacking and assembling the members.

First, as shown in FIG. 4A, the first sub-circuit board 144 is disposed at the bottom of the first casing 110 and is therefore similarly disposed at the keyboard 131 and the touch panel 132 for assembly and to allow the electrical transmission members 131a and 132a to be plugged into the electrical connectors 144a and 144b, so as to complete the assembly of the semi-finished product. Next, as shown in FIG. 2, the motherboard 141 and the second sub-circuit board 143 are assembled at the second casing 120 in advance. Next, the first mezzanine connector 151, the second mezzanine connector 152, the bridge circuit board 142, and the semi-finished product formed by the first casing 110 and related members may be stacked on the second casing 120 one by one. As a result, different portions of the bridge circuit board 142 (the protrusion one 142a, the protrusion two 142b, and the protrusion three 142c) are respectively connected to the motherboard 141, the second sub-circuit board 143, and the first sub-circuit board 144.

Figure 5:
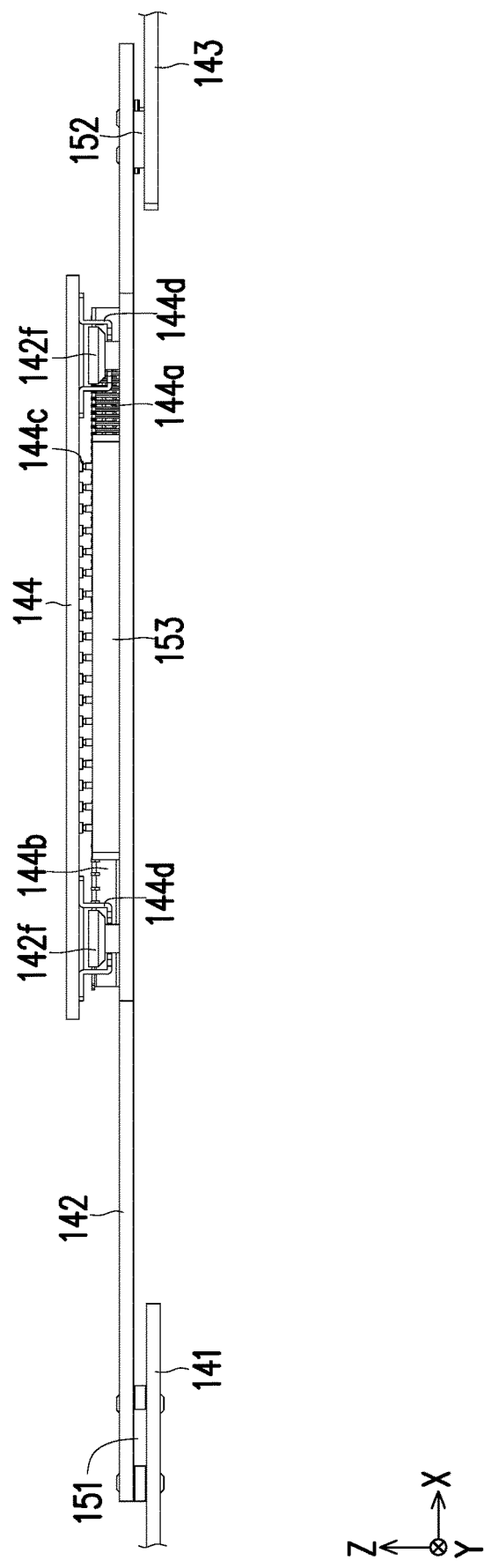
FIG. 5 shows some members of FIG. 2 from another perspective.

FIG. 5 shows some members of FIG. 2 from another perspective. Please refer to FIG. 5, as shown in the above assembly relationship between the motherboard 141, the bridge circuit board 142, the second sub-circuit board 143, and the first sub-circuit board 144, after assembly, the bridge circuit board 142 is substantially located between the first sub-circuit board 144 and the motherboard 141 along the Z-axis, and located between the first sub-circuit board 144 and the second sub-circuit board 143 to form the circuit boards in the system host, which are interconnected according to different modules.

Please refer to FIG. 2, FIG. 3C, and FIG. 4A (or FIG. 5) again. In order to facilitate the smooth bridging of the above members, the bridge circuit board 142 of the present embodiment also has a pair of protruding posts 142f located at two opposite sides of the pogo pin connector 153, and the first sub-circuit board 144 also has a pair of guide grooves 144d to facilitate the protruding posts 142f to move into the guide grooves 144d along the Y-axis to produce a retaining effect along the Z-axis to facilitate the connection between the pogo pin connector 153 and the conductive contact pads 144c and prevent falling off.

Moreover, please refer to FIG. 3C and FIG. 4A and compare with FIG. 3A, FIG. 3B, or FIG. 4B. The first mezzanine connector 151 of the present embodiment also includes positioning posts 151c located at two opposite surfaces of the plate body one 151a for positioning to the protrusion one 142a of the bridge circuit board 142 and the motherboard 141. The second mezzanine connector 152 also includes positioning posts 152c located at two opposite surfaces of the plate body two 152a and used to position to the protrusion two 142b and the second sub-circuit board 143. Moreover, as shown in FIG. 2, the laptop computer 100 also includes a plurality of locking members C1 to C4 (such as screws) to lock the bridge circuit board 142, the motherboard 141, and the second sub-circuit board 143 together after the positioning is completed.

It should also be mentioned that, please compare the first mezzanine connector 151 and the second mezzanine connector 152 of the present embodiment, it may be found that, the number of constituent units of the conductive array one 151b is greater (more than) the number of constituent units of the conductive array four 152b, wherein the reason is that the bridge circuit board 142 is responsible for connecting the electrical signals of the keyboard 131, the touch pad 132, and the connectors 170 with the motherboard 141. Therefore, the signal transmission amount that the first mezzanine connector 151 is responsible for is actually the sum of the signal transmission amounts of the pogo pin connector 153 and the second mezzanine connector 152.

Moreover, since the connector 170 still involves high-speed signal transmission, but the keyboard 131 and the touchpad 132 do not, the connectors 170 perform high-speed signal transmission with the motherboard 141 via the second sub-circuit board 143, the second mezzanine connector 152, the bridge circuit board 142, and the first mezzanine connector 151. In other words, in order to maintain the ability of the connectors 170 to transmit signals at high speed, in comparison, the first mezzanine connector 151 and the second mezzanine connector 152 of the present embodiment may not be replaced by the pogo pin connector 153.

Based on the above, in the above embodiments of the invention, the member configuration of the system host of the laptop computer, especially the assembly configuration of the circuit board, matches the assembly method of the first casing and the second casing of the system host, and adopts stacked assembly to effectively simplify the assembly process, wherein the first casing and the keyboard, the touch panel, and the first sub-circuit board assembled thereon are regarded as a set of semi-finished products, and the second casing the motherboard and the second sub-circuit board disposed thereon are regarded as another set of semi-finished products. When the semi-finished products are independently completed, the bridge circuit board may be abutted between the two groups of semi-finished products, so that the electrical connection relationship of a plurality of circuit boards may also be completed while the structure is assembled, without the need to manage wires or cables and plug in connectors as in the prior art.

At the same time, the structural assembly adopts stacked assembly, so users do not need to worry about whether to reserve space for the connectors and wires (or cables) to be plugged in. In other words, the laptop computer of the invention may be assembled one by one using an intuitive assembly method due to the stacked and assembled members. Therefore, the assembly process may be effectively simplified and time and assembly costs may be reduced, thus also affecting the process and costs needed for subsequent maintenance. This is equivalent to providing a simplified disassembly and assembly process, so that the laptop computer has a repairable and regenerative nature, which is conducive to achieving the above sustainability conditions.

What is claimed is:

1. A laptop computer, comprising: a first casing; a first sub-circuit board disposed at the first casing; an input module disposed at the first casing and electrically connected to the first sub-circuit board; a second casing; a motherboard disposed at the second casing; and a bridge circuit board, wherein the first casing and the second casing are assembled together, such that the first sub-circuit board, the bridge circuit board, and the motherboard are partially overlapped, and the first sub-circuit board is electrically connected to the motherboard via the bridge circuit board; and the bridge circuit board has a protrusion one, a protrusion two, and a protrusion three, the protrusion one is partially stacked on the motherboard and electrically connected to the motherboard via a first mezzanine connector, the protrusion two is partially overlapped on the second sub-circuit board and electrically connected to a second sub-circuit board via a second mezzanine connector, and the first sub-circuit board is stacked on the protrusion three and electrically connected to the bridge circuit board via a pogo pin connector.

2. The laptop computer of claim 1, the second sub-circuit board is disposed at the second casing, the connector is disposed on the second sub-circuit board, when the first casing and the second casing are assembled together, the second sub-circuit board is partially stacked at the bridge circuit board, and the connector is electrically connected to the motherboard via the second sub-circuit board and the bridge circuit board.

3. The laptop computer of claim 2, wherein the first mezzanine connector comprises a plate body one and two conductive arrays one, the two conductive arrays one are respectively disposed on two opposite surfaces of the plate body and electrically connected to each other correspondingly, the protrusion one has a conductive array two, the motherboard has a conductive array three, and the two conductive arrays one are connected to the conductive array two and the conductive array three respectively.

4. The laptop computer of claim 3, wherein the two conductive arrays one are elastic piece arrays respectively, and the conductive array two and the conductive array three are contact pad arrays respectively.

5. The laptop computer of claim 2, wherein the first mezzanine connector has a conductive array, the second mezzanine connector has another conductive array, and a number of constituent units of the conductive array is greater than a number of constituent units of the other conductive array.

6. The laptop computer of claim 2, wherein the at least one connector performs a high-speed signal transmission with the motherboard via the second sub-circuit board, the second mezzanine connector, the bridge circuit board, and the first mezzanine connector.

7. The laptop computer of claim 2, wherein the second mezzanine connector comprises a plate body two and two conductive arrays four, the two conductive arrays four are respectively disposed on two opposite surfaces of the plate body and electrically connected to each other correspondingly, the protrusion two has a conductive array five, the second sub-circuit board has a conductive array six, and the two conductive arrays four are connected to the conductive array five and the conductive array six respectively.

8. The laptop computer of claim 7, wherein the two conductive arrays four are elastic piece arrays respectively, and the conductive array five and the conductive array six are contact pad arrays respectively.

9. The laptop computer of claim 1, further comprising a pogo pin connector electrically connected between the first sub-circuit board and the bridge circuit board.

\* \* \* \* \*